(No Model.)
W. BORCHERS.
PROCESS OF TRANSFORMING CHEMICAL ENERGY OF FUEL INTO ELECTRICAL ENERGY.
No. 567,959. Patented Sept. 22, 1896.
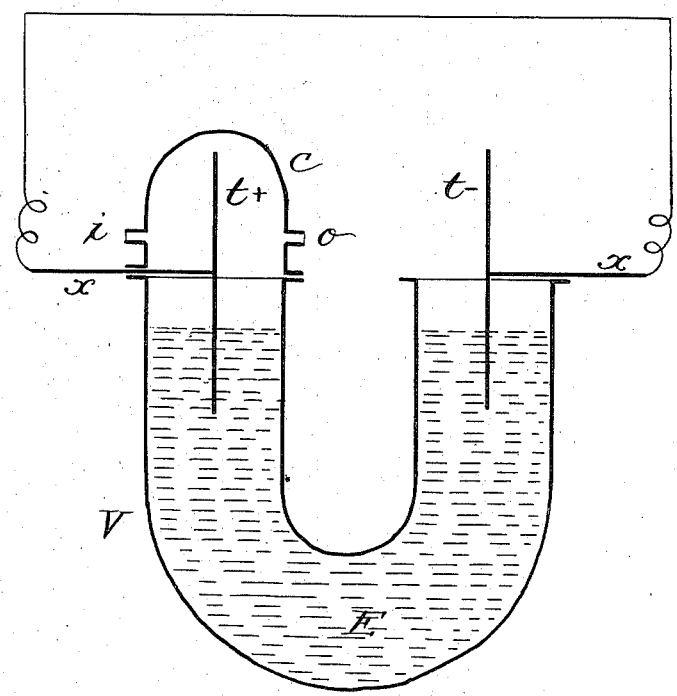
Attest
Walter Donaldson
F. L. Middleton
Inventor
Wilhelm Borchers
by Richards & Co.
Attys.

UNITED STATES PATENT OFFICE.

WILHELM BORCHERS, OF DUISBURG, GERMANY.

PROCESS OF TRANSFORMING CHEMICAL ENERGY OF FUEL INTO ELECTRICAL ENERGY.

SPECIFICATION forming part of Letters Patent No. 567,959, dated September 22, 1896.

Application filed November 21, 1894. Renewed August 21, 1896. Serial No. 603,544. (No specimens.)

*To all whom it may concern:*

Be it known that I, WILHELM BORCHERS, a subject of the King of Prussia, German Emperor, residing at the city of Duisburg-on-the-Rhine, in the Kingdom of Prussia, German Empire, have invented certain new and useful Improvements in the Process of Transforming the Chemical Energy of Fuel into Electrical Energy, of which the following is a specification.

My invention refers to galvanic batteries with two or more cells in which gases obtained by imperfect combustion or by destructive distillation, or by both imperfect combustion and destructive distillation, of coal and other fuel are oxidized by the oxygen of the air, so as to generate a large amount of the chemical energy of such fuel as electrical energy, using solutions of metals as electrolytes.

The gases I have under consideration are carbon monoxid, (CO,) and all gases containing carbon monoxid, as, for instance, the common coal generator-gas, water-gas, and the escape-gases from blast-furnaces. Furthermore, such gases from coal containing, besides carbon monoxid, chiefly hydrocarbons, free hydrogen, and other combustible gases, as, for instance, lighting-gas, escape-gas from coke-ovens, charcoal-ovens, and other appliances; in short, all combustible gases that can be obtained from coal and other natural fuel.

The principal point of my invention is the use of an electrolyte which in the first instance is a good solvent for either of the gases named, and which on the other hand is able to become chemically changed by the gases named, so that with the oxygen of the air it will form a product that tends to oxidize the product formed by the electrolyte and the fuel-gas. In this point my invention differs from all other inventions hitherto made on gas-batteries.

A salt which will best serve as an electrolyte for the purpose just stated is cuprous chlorid, ($Cu_2Cl_2$,) dissolved in acid, alkaline, or salt solutions.

Oxygen will oxidize the cuprous into cupric chlorid if muriatic acid be present or if substances are present that give up muriatic acid:

I. $Cu_2Cl_2 + 2HCl + O = 2CuCl_2 + H_2O$. 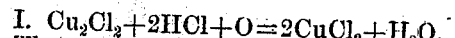

The above-named fuel-gases have, as is known from gas analysis, the tendency of reducing copper from solutions of cuprous chlorid. Taking carbon monoxid as example, the process may be explained by the following equations:

II. $Cu_2Cl_2 + CO = Cu_2Cl_2CO$. 
III. $Cu_2Cl_2CO + H_2O = Cu_2 + 2HCl + CO$. 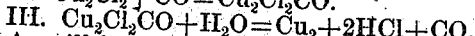

As will be seen, process III furnishes the necessary muriatic acid for process I. However, before the copper liberated according to equation III is really deposited as substantial metal a reaction takes place between the products of process I and the products of process III according to the following equation:

IV. $2CuCl_2 + Cu_2 = 2Cu_2Cl_2$. 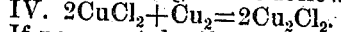

If now we take the algebraic sum of these four equations, the net result will be:

V. $CO + O = CO_2$. 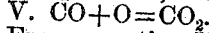

From equation IV it will be seen that the electrolyte is constantly being recovered.

The accompanying drawing shows a U-shaped vessel $v$ of non-conducting material to hold the electrolyte E. Each compartment holds at the upper end a terminal or electrode, $t+$ $t-$, respectively, to connect the electrolyte in the vessel with an external circuit for the electric current to be generated. These terminals may consist of any conducting substance which is not attacked by the electrolyte or by the gases mentioned. Therefore platinum and other metals of the platinum group, gold, and carbon, may be used. The electrode marked $t+$ may also be made of copper, if the substances just named are not preferred, and just as well the electrode marked $t-$ may consist of a conducting metallic oxid, such as oxid of copper, (CuO.)

The compartment containing the terminal $t+$ is provided with a cap $c$, that contains gas-inlets $i$ and gas-outlets $o$. Into the cap $c$, by means of the inlet $i$, I conduct carbon monoxid or any of the other fuel-gases. Part of such gases will be dissolved and will influence the solution, as described in equations II and III. The rest of the gas will escape through the outlet $o$ and may be conducted through one or more batteries of the same kind.

To the open compartment of the vessel $v$ air has free admission. The oxygen of the air will influence the electrolyte in the manner described in equation I, and while the resulting processes, as shown by equations IV and V, are going on an electric current is generated that may be utilized in the external circuit.

Therefore what I claim as new is—

The herein-described process of generating electricity consisting in placing a bath of cuprous chlorid in a closed circuit, dissolving fuel-gas in said bath of cuprous chlorid at one point and dissolving oxygen of the air at another point in the bath, substantially as described.

In witness whereof I have hereunto set my hand in presence of two witnesses.

WILHELM BORCHERS.

Witnesses:
ERNESTINE ANDRÉ,
LAURA LIEBER.